United States Patent [19]

Aho et al.

[11] 3,810,112

[45] May 7, 1974

[54] SHIFT-SHUFFLE MEMORY SYSTEM WITH RAPID SEQUENTIAL ACCESS

[75] Inventors: Alfred Vaino Aho, New Providence; Jeffrey David Ullman, Princeton, both of N.J.

[73] Assignee: Bell Laboratories Incorporated, Murray Hill, N.J.

[22] Filed: Dec. 18, 1972

[21] Appl. No.: 316,109

[52] U.S. Cl. .................................. 340/172.5, 328/37

[51] Int. Cl. ............................................... G06f 7/00

[58] Field of Search .................... 340/172.5; 328/37; 307/221

[56] References Cited

UNITED STATES PATENTS

| | | | |
|---|---|---|---|
| 3,371,320 | 2/1968 | Lachenmayer | 340/172.5 |
| 3,103,580 | 9/1963 | Foreman | 340/172.5 |
| 3,596,251 | 7/1971 | Buchan et al. | 340/172.5 |
| 3,611,309 | 10/1971 | Zingg | 340/172.5 |

*Primary Examiner*—Paul J. Henon
*Assistant Examiner*—John P. Vandenburg
*Attorney, Agent, or Firm*—Robert O. Nimtz

[57] ABSTRACT

A shift register memory having interconnections among its internal stages permitting stored data to be rearranged in two different ways. A first set of interconnections permits the usual cyclic rotation of data in response to a first "shift" control pulse. A second set of interconnections permits data to be rearranged in a shuffle pattern in response to a second "shuffle" control pulse, similar to the rearrangement of cards in a deck when shuffled. A pair of control registers records the current state of the data arrangement. Addressing circuitry calculates the present storage location of an addressed datum from this state information. Additional circuitry generates an accessing sequence of shift and shuffle control pulses which brings the addressed datum to the output stage of the shift register. After data at two succeeding addresses have been accessed in this fashion, all the data in the shift register have been reordered and succeeding datum addresses may be accessed with a single shift pulse per address.

14 Claims, 7 Drawing Figures

RANDOM ACCESS 2-SHUFFLE CONTROL

2-SHUFFLE SHIFT REGISTER MEMORY

SHIFT-SHUFFLE MEMORY SYSTEM WITH RAPID SEQUENTIAL ACCESS

BACKGROUND OF THE INVENTION

1. Field of the Invention

This invention relates to memory systems, and in particular, to shift register memories having enhanced data rearrangement capabilities.

2. Description of the Prior Art

The memory system described herein is of the class of memories termed "dynamic" memories, so called because the contents of the memories are physically rearranged under the influence of control signals. The most common example of a dynamic memory is the ordinary cyclic shift register wherein all stored data moves into adjacent data positions in the register under the influence of a shift control pulse. A sequence of shift pulses is used to move a desired datum from its current shift register stage or cell to an output stage where the datum can be read or altered.

A problem with such a shift register memory is the relatively long delay or latency time for accessing a desired datum which is not currently near the output stage. In general, the average latency time for such a shift register memory is of the order N/2, where N is a number of stages of the shift register.

Proposals have been made for reducing the access time of dynamic memories by the use of more complex data rearrangement schemes. One rearrangement scheme which has been investigated is the so called "shuffle." This is best understood by considering the rearrangement of cards in a deck when shuffled perfectly. The deck of cards is divided into an upper half and a lower half. Alternate cards from the upper and lower halves are interlaced and the deck reunited. The topmost card remains on the top. The new second card was formerly the top card of the lower half. The new third card was formerly the second card of the upper half. The new fourth card was formerly the second card of the lower half, and so on. Of course, a person performing a shuffle will rarely perfectly interlace the cards in this fashion. But circuitry is not subject to human error and the literature frequently refers to such a shuffle rearrangement as a "perfect shuffle."

The implementation of a pefect shuffle using a shift register memory follows directly. Suitable gating and data paths are provided so that the entire shuffle rearrangement of data takes place simultaneously, in a single clock cycle under control of a single control pulse, just as the cyclic shift of data normally takes place in a single clock cycle in response to a single control pulse. The data stored at each shift register location may be a single binary digit, a character of information, a computer word, or any other increment of data stored as a unit. Only the data currently occupying the initial cell, the output stage, corresponding to the topmost card in the deck, is accessible for reading or writing.

Various application of the shuffle data rearrangement can be found in the background article by H. S. Stone, "Parallel Processing with the Perfect Shuffle" *I.E.E.E. Transactions on Computers*, Vol. C20, pages 153–161, February 1971.

It can be seen that this shuffle rearrangement has potential for reducing access time in a memory system. For example, in a normal shift register the datum stored in cell N/2 would require N/2 shift control signals. With a shuffle interconnection, the datum at cell N/2 would be moved to within one location of the output stage with a single shuffle control signal.

The shuffle alone, however, is not sufficient to access memory. This is clear from the fact that the contents of the output (first) stage is not altered by the shuffle rearrangement. An additional data rearrangement capability such as a cyclic shift must also be provided. The cyclic shift has not been used heretofore because of the lack of an addressing scheme for retrieving a desired datum.

The prior art has instead suggested that the second rearrangement be a so-called "exchange" because an addressing scheme was discovered making retrieval possible. Under the exchange rearrangement, the contents of adjacent data cells are exchanged so that even-odd pairs of data cells interchange information in response to an exchange control pulse. Such an exchange-shuffle memory is disclosed in "Dynamic Memories With Enhanced Data Access" *I.E.E.E. Transactions on Computer* — Vol. C-21, No. 4, April, 1972 by Harold S. Stone. Stone demonstrates that the exchange-shuffle memory can randomly access data in a time of the order $\log_2 N$. The disadvantage of such a memory system, is that each datum must be accessed through the random accessing sequence and each datum is subject to the same average delay. Stone speculates that a shift-shuffle memory system based on the shuffle used in combination with the cyclic shift might be advantageous if an addressing scheme could be found. In the final two paragraphs of this article at pages 365–366 Stone summarizes two problems faced by the prior art:

. . . . Since a larger variety of memory states is attainable; it might be more advantageous to use shuffle and cyclic shift pair for many applications. Unfortunately, we lack a convenient way of placing the memory in any desired state with a simple and fast algorithm. An outstanding problem is to construct a control algorithm that is easily implementable as are the algorithms in [this article].

Probably the most important outstanding problem concern the design of a memory in which access time to any word in the memory is of the order $\log_2 N$ from any arbitrary state, but after accessing an item, items at successive addresses can be accessed at successive unit times. In the memory described in [this article], items at successive addresses have the same access time as the first item. If this problem can be solved, the dynamic memory will act like a drum with a latency of $\log_2 N$, and a transfer rate of one word per unit time. Stone has thus summarized two major outstanding problems which have stood in the way of development of a practical memory system utilizing a shuffle rearrangement: (1) a straightforward method for addressing the contents of a shift-shuffle memory; and (2) the lack of a dynamic memory of any sort having the desirable property of rapid access to sequential pieces of stored data. The present invention presents in a single memory system, solutions to both of these problems. A shift-shuffle memory is disclosed having a simple addressing scheme and also having rapid sequential accessing capabilities.

SUMMARY OF THE INVENTION

The present invention is a shift-shuffle dynamic memory system. The memory system includes storage means for retaining data at N distinct storage locations, the contents of which may be both cyclically shifted and shuffled in a perfect shuffle pattern in response to appropriate control signals. For access, system further includes control means for providing a sequence of control signals to bring an addressed datum to an output storage location of the storage means.

The number of data locations N in the storage means satisfies the mathematical relationship $N = r^k - 1$ where $r$ is a small integer ($r \geq 2$) termed the radix. The choice of the number $r$ for any particular memory system is structurally reflected in the shuffle data interlace pattern of the storage means, which is unique for each value of $r$. The number $k$ is an integer ($k \geq 1$) which is selected according to the total number of data locations desired.

As an example, it is common in the prior art to design memory systems in multiples of $N = 4096 = 2^{12}$ words. A shift-shuffle memory system designed according to the teachings of the present invention of approximately the same size might have $N = 4{,}095 = 2^{12} - 1$ words. For this case $r = 2$, $k = 12$, and the data interlace pattern will be termed herein a 2-shuffle. A second exemplary memory design might have $N = 4{,}095 = 4^6 - 1$ words. For this second case $r = 4$, $k = 6$, and the data interlace pattern would be a 4-shuffle. The expression $r^k - 1$ is also reflected structurally in the control means. Address arithmetic performed by the control means circuitry is performed using $(r - 1)$'s complement arithmetic. In addition, address circuitry external to the memory system may conveniently employ $(r - 1)$'s complement arithmetic. For example, with a radix of $r = 2$, $N = 2^k - 1$, and address arithmetic is performed within the control means using one's complement arithmetic. Location counters, index registers and other circuitry external to the memory system might also advantageously use one's ccomplement arithmetic. A $k$-bit location counter for example, normally has $2^k$ states, however with one's complement arithmetic techniques such as end-around-carry, the number of usable states is one less or $2^k - 1$, precisely the number of data locations in the shift-shuffle memory. Further, there is a convenient relationship between the digits of an address derived using one's complement arithmetic, and the sequence of shift and shuffle operations used to access a datum stored at that address in a 2-shuffle memory. Thus the $r^k - 1$ number of storage locations and the $(r - 1)$'s complement arithmetic contribute to the novel addressing scheme employed herein.

Each unit of information or datum which is stored in the memory means has a fixed datum address. Each datum may be uniquely referenced by this datum address without regard to the particular storage location in which the datum may currently reside, e.g., any of the N locations. The circuitry of the control means receives the datum address of the information sought and calculates the current storage location in the storage means where the datum may be found.

The current storage location address of a datum having a datum address $j$ may be found from an expression of the form $r^p j + q$. The numbers $p$ and $q$ are integers which represent the current state of the data arrangement in the storage means, and which may be conveniently registered and retained within the control means. Digits of the storage location address leads the control means to the generation of a sequence of shift and shuffle control signals to bring the contents of the addressed storage location to the output stage, the storage location having location address zero. With each control signal, the registered values of p and q are conveniently updated simultaneously to reflect the new current state of data stored in the storage means.

Having randomly accessed a first datum $j$, the datum having the next sequential datum address $j + 1$ may be brought adjacent to the output stage with only a series of up to $k$ shuffle control signals. Having accessed two consecutive data addresses, the entire contents of the storage means has been completely reordered so that any number of subsequent data items beginning with datum address $j + 2$ may be accessed with only a single shift control signal per datum. Circuitry may be included in the control means permitting abbreviated control activity in the accessing of addresses $j + 1$ and $j + 2$, et seq, without the full random access datum seek operation.

Thus the inventive memory system advantageously produces random access to any given data item within a time of the order $\log_2$ N. A succeeding data item may be accessed in a time of order $k$ and further succeeding data items may be accessed with a constant unit delay.

In the disclosed embodiment of the memory system data storage means is provided in the form of a shift register memory having interconnections between its internal data storage locations permitting its contents to be cyclically shifted in response to a shift control pulse, and rearranged in a shuffle pattern in response to a shuffle control pulse. The control means for generating the shift and shuffle pulses includes a pair of control register p and $q$ which records the current state of the shift register data arrangement. Control circuitry calculates the present storage location address of a desired datum from its datum address and the contents of the $p$ and $q$ registers. Other circuitry examines the digits of the storage location address and produces a sequence of shift and shuffle control pulses to bring the datum to the output stage of the shift register. Additional circuitry may provide for an abbreviated procedure in accessing the next succeeding datum address by producing only shuffle control pulses, and for accessing further sequential data by producing only shift control. Thus, the disclosed invention advantageously acts in overall function like a disk or drum storage with a latency of $\log_2 N + k$ and a transfer rate of one word per unit time. This and other advantages will become obvious from the following detailed description of the invention.

DETAILED DESCRIPTION OF THE PREFERRED EMBODIMENT

Figure 1:
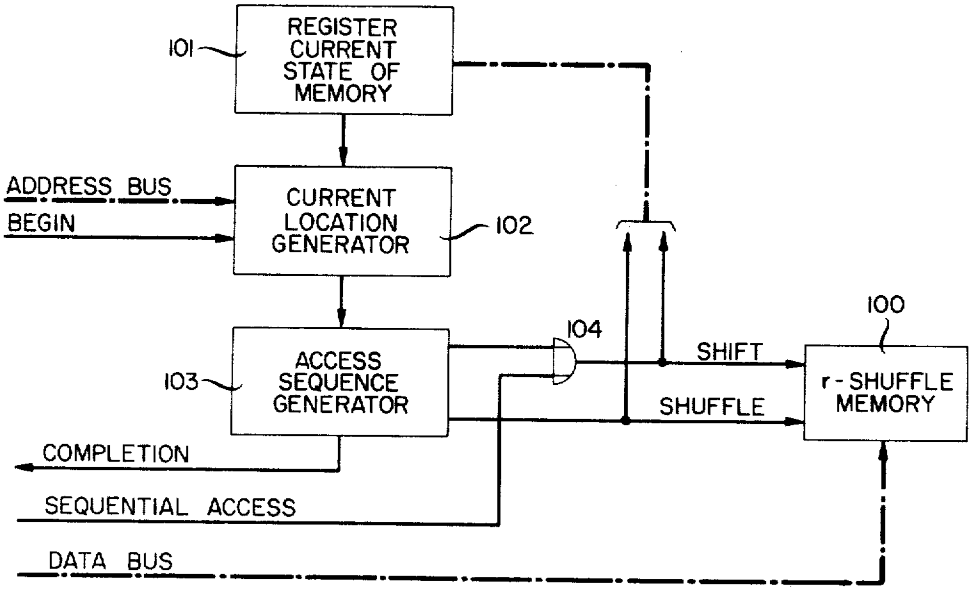
FIG. 1 is a block diagram of an inventive memory system including control circuitry and an $r$-shuffle memory.

FIG. 1 is a block diagram of an r-shuffle memory system. Memory 100 is a shift register memory having shift and shuffle interconnection patterns among its various cells. The general form of an *r*-shuffle pattern will be described later with respect to FIG. 6. A data bus carries information to be read or written at a single fixed output stage, hereafter referred to as $cell_0$. In response to shift and shuffle control pulses, the contents of memory 100 undergoes the corresponding cyclic shift or *r*-shuffle data rearrangement.

The remainder of FIG. 1 is a block diagram of access control circuitry for bringing a desired datum to $cell_0$. Register means 101 records the current state of the data arrangement of memory 100 and is updated with each shift or shuffle control pulse. The datum address of a sought piece of information is input to location generator 102 along with a BEGIN control signal. Using the current state information of register means 101 and the datum address, generator 102 calculates the current cell address of the datum.

Access sequence generator 103 examines the digits of the cell address to generate a proper sequence of shift and shufflee control pulses to bring the datum to $cell_0$, the output stage. Generator 103 then produces a COMPLETION signal to indicate the end of the data seek operation. Data may then be written or read at $cell_0$ of memory 100 over the data bus.

A data seek of two sequential datum addresses reorders the contents of memory 100 and subsequent datum addresses may be accessed with single shift pulses. To this end OR-gate 104 permits abbreviated control activity by permitting direct shift control of memory 100 to bring subsequent datum addresses to $cell_0$ without incurring the delay of the entire random accessing action. Shift and shuffle pulses are conveyed to register means 101 in order to keep accurate the current state information of the contents of memory 100.

The structure of an *r*-shuffle memory system is dependent on the value of radix *r*. In the description which follows, a 2-shuffle memory system (for radix $r = 2$) will be described in some detail. A general embodiment of an *r*-shuffle memory system suitable for any radix *r* will then be described. This *r*-shuffle embodiment will include extra control circuitry which provides for the rapid access of sequential datum addresses without necessitating multiple random accesses.

Figure 2:
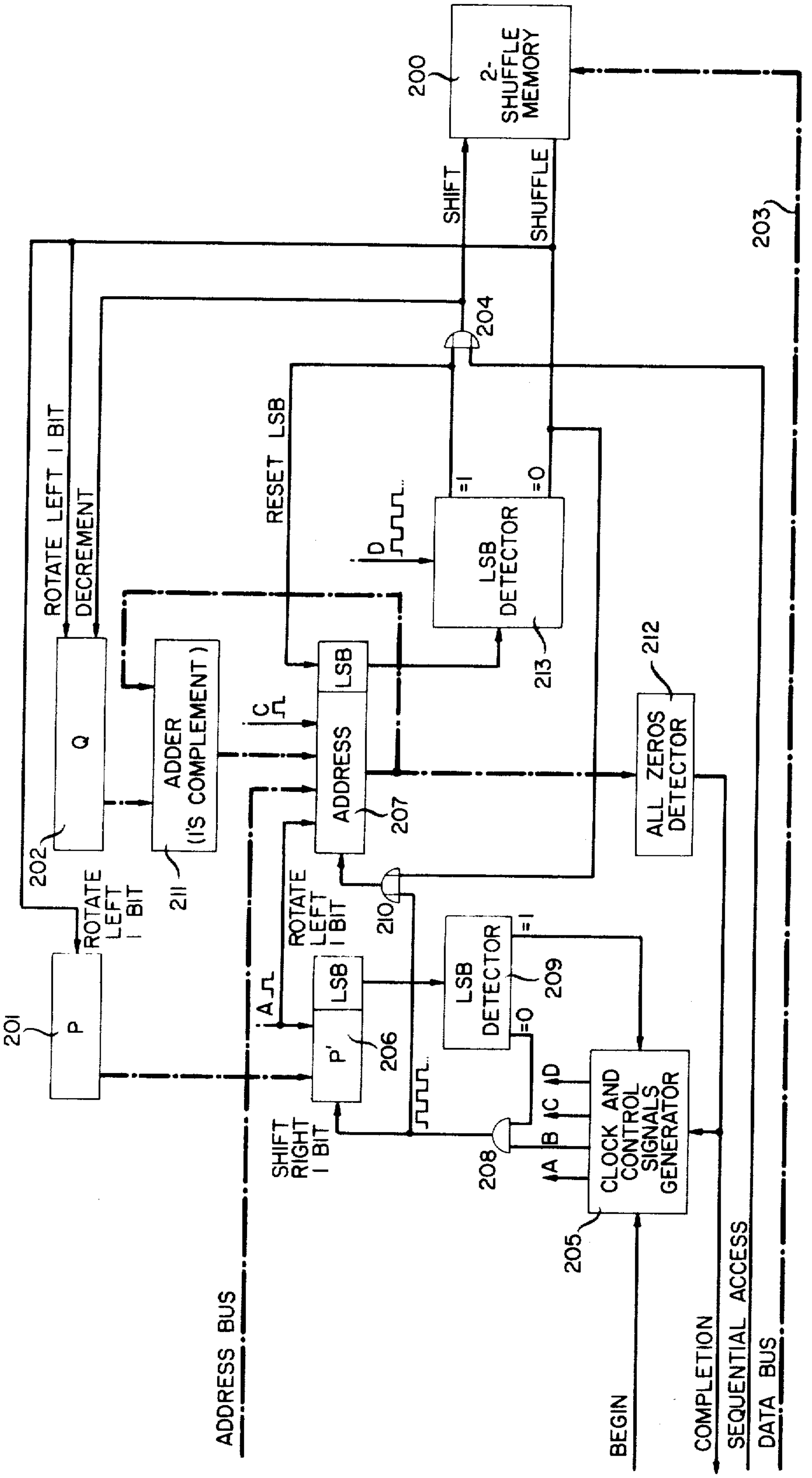
FIG. 2 is a schematic diagram of a control circuit for providing random access to a 2-shuffle memory.
Figure 3:
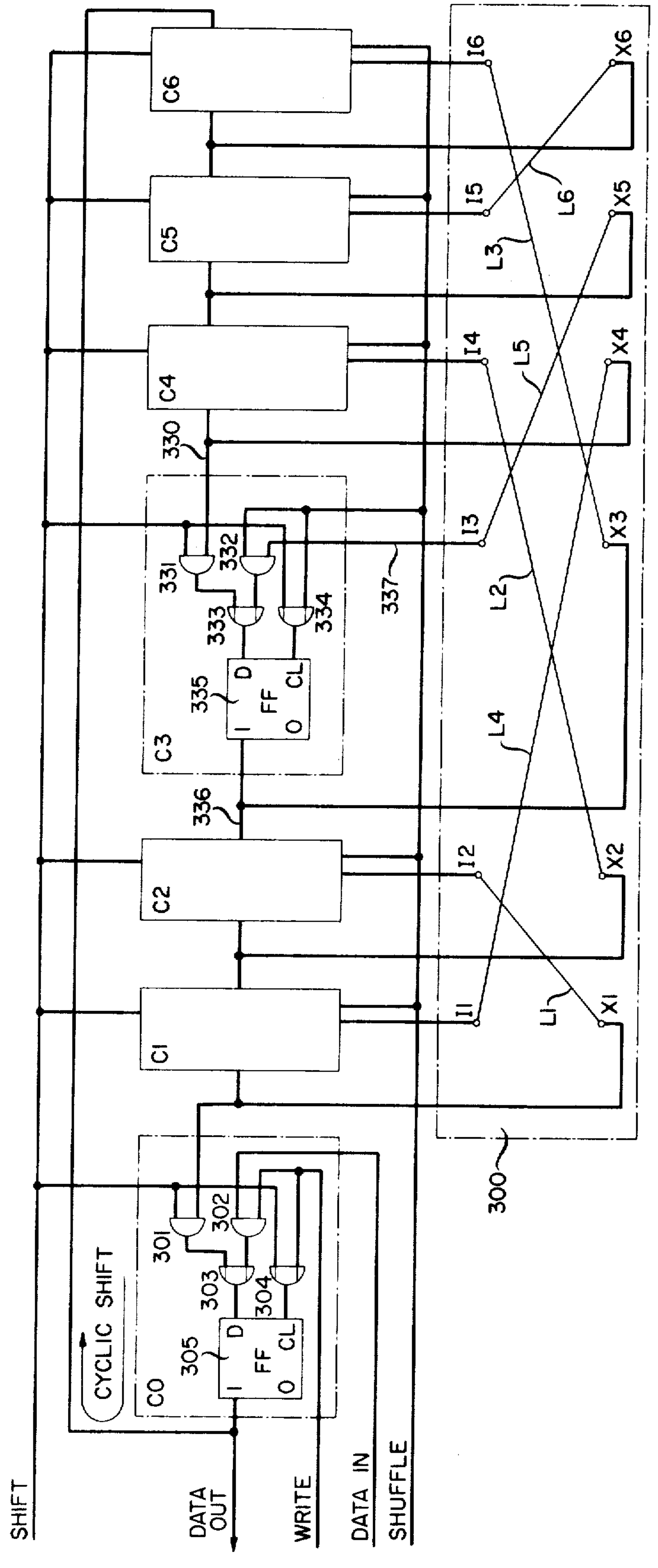
FIG. 3 is a 2-shuffle memory using shift register techniques.

Turning now to the detailed description of a 2-shuffle memory system, FIG. 2 is a schematic diagram showing the control circuitry for 2-shuffle memory 200, shown in detail in FIG. 3. The shuffle interconnections among the various cells of memory 200 are shown at 300 in FIG. 3 and are summarized in diagrammatic form in FIG. 4.

The current state of the data arrangement in memory 200 is registered in p-register 201 and *q*-register 202 of FIG. 2. It will be recalled that the number N of storage locations or cells of memory 200 satisfies the mathematical relationship $N = 2^k - 1$, where *k* is chosen to produce the desired memory size. The p-register 201 is a cyclic shift register having *k* stages containing a single "1" whose offset from the least significant bit (LSB) position indicates the number of shuffles (module *k*) which have been applied to memory 200. Thus with each shuffle the contents of *p*-register 201 is shifted to the left, the most significant bit (MSB) being recirculated into the LSB position. The *p*-register 201 is utilized as a counter which is incremented for each shuffle and could alternatively be implemented by a binary counter having *k* states.

The *q*-register 202 is a binary down-counter and cyclic shift register having *k* stages. The contents of *q*-register 202 is a binary address which is the current cell address of datum address zero. That is *q*-register 202 contains the current cell number in which $datum_0$ resides. With each shuffle of memory 200, the contents of *q*-register 202 is shifted (rotated) to the left, the MSB being recirculated into the LSB position. A shift of memory 200 causes *q*-register 202 to count down by one using one's complement arithmetic. That is, when *q*-register 202 is in the all zero state, decrementation yields all one's except for the LSB which is reset to zero. This can be implemented by the known techniques of end-around borrow. Thus, when $datum_0$ is moved from $cell_0$ to $cell_{N-1}$ during a cyclic shift of memory 200, the contents of *q*-register 202 changes from 0 to $(2^k - 1) - 1 = N - 1$ by one's complement arithmetic. $Datum_0$ is a reference datum where cell address is used as a reference address for calculating the cell address of any given datum. The cell address of any datum could be used as a reference address, but $datum_0$ is chosen for convenience of mathematical manipulation.

MATHEMATICAL CONSIDERATIONS — 2-SHUFFLE

The further roles of *p*- and *q*-registers 201 and 202 in calculating the cell address of any given datum will become clear by the following discussion. As shown diagrammatically in FIG. 4, a 2-shuffle memory comprises N cells numbered for convenience $cell_0$ through $cell_{N-1}$. The datum address of a unit of information is defined to be its initial cell address prior to any shifts or shuffles. In the initial state of the memory system $datum_0$ is contained in $cell_0$, $datum_1$ is contained in $cell_1$, and et cetera. The *p*-register 201 is initialized to contain a "1" in the LSB position. An offset of zero indicates no shuffles have yet been performed. Since $datum_0$ is initially contained in $cell_0$, *q*-register 202 is initialized to all zeros.

In this initial condition, it is simple to show that the cell address of any datum whose datum address is *j* is given by the expression $$2^p j + q \text{(modulo N)} \tag{1}$$

where *p* and *q* are the contents of p-register 201 and q-register 202 respectively. (Any number modulo N is the remainder when the number is divided by N. Thus a counter with N states counts modulo N. For a discussion of modular arithmetic, see e.g. G. H. Hardy and E. M. Wright, *An Introduction to the Theory of Numbers*, Oxford University Press, 1962.)

The contents of p-register 201 may be interpreted in two different ways which are completely equivalent. The offset of the single one in *p*-register 201 can be taken as the number $p$ in expression (1). Alternatively, the contents of p-register 201 may be considered a binary representation of the quantity $2^p$. The number stored in $q$-register 202 is simply the binary address of $datum_0$, a reference address. Substituting now into expression (1)

$$\text{cell address of } datum_j = 2^p j + q \text{ (modulo N)}$$
$$= 1 \cdot j + 0$$
$$= j \cdot$$

Thus in this initial condition expression (1) yields that any datum of address $j$ will be found in cell having address $j$.

In order to complete the proof that expression (1) always yields the current location for $datum_j$ under any state of memory 200, it is necessary to mathematically express the effects of the shift and shuffle on the contents of memory 200.

The effect of a cyclic shift is to move the contents of each cell into the adjacent cell of lower cell address while the datum in $cell_0$ is moved to $cell_{N-1}$. A cyclic shift therefore acts to decrease the cell address of any given datum by one (modulo N). Thus if the original cell address is $2^p j + 9$, under the cyclic shift, this number is decreased by one (modulo N).

$$2^p j + q \text{ (modulo } N) - 1 \text{ (modulo N)}$$
$$= 2^p j + (q - 1) \text{ (modulo N)}$$

By decrementing the number contained in $q$-register 202 for each cyclic shift, ($q$-register 202 counts modulo N) expression (1) gives the new cell address of each datum for any values of $p$ and $g$.

The effect of the 2-shuffle is to move each datum from its original cell into a cell with address two times the original address (modulo N). This can be most easily seen from FIG. 4 where the contents of each $cell_i$ in the upper half is moved into $cell_{2i}$, and the contents of each cell in the lower half is moved into $cell_{2i-N}$. The 2-shuffle thus acts to multiply the cell address by two (modulo N). Thus if the original cell address is given by $2^p j + q$ (modulo N), under the shuffle, the new address is given by $$2\,[2^p j + q \text{ (modulo) }] \text{ (modulo N)}$$
$$= 2^{p+1} j + 2q \text{ (modulo N)}$$

This expression indicates that the contents of $q$-register 202 should be multipled by two (modulo N) which is accomplished by cyclically shifting $q$-register 202 left by one bit position. In addition, the expression indicates that the contents of $p$-register 201 (expressed as a binary number $2^p$) should also be multiplied by two (modulo N). This is accomplished by cyclically shifting the contents of $p$-register 201 to the left by one bit position forming $2^p{}_-{}^1$ (modulo N). Equivalently, the contents of $p$-register 201 (expressed as the offset of the contained one from the LSB position) may be considered increased by one ($p$ + 1 [modulo $k$]) by shifting to the left. It will be understood that $p$-register 201 may be considered either as a modulo N counter of the number $2^p$ or, alternatively, a modulo $k$ counter of the number $p$.

Cell Address Calculation for 2-Shuffle — General Description

The control circuitry of FIG. 2 locates the current cell address of any desired $datum_j$ from the contents of $p$-register 201 and $q$-register 202 by performing the address calculation $2^p j + q$. This is executed in the following manner:

The binary datum address $j$ enters on the address bus in parallel binary form. A BEGIN control signal enters clock and control signal generator 205 which provides control pulse A, B, C and D. To begin control circuitry activity an A-pulse extends to $p'$-register 206 and address register 207. The $k$ bits of the number stored in $p$-register 201 are thereby gated into $p'$-register 206 and the $k$ bits of address $j$ are thereby gated into address register 207. Generator 205 next produces a series of B-pulses which extend through AND-gate 208 to shift the contents of $p'$-register 206 to the right until the single one contained therein appears in the LSB position. This fact is detected by LSB detector 209. B-pulses from AND-gate 208 also extend through OR-gate 210 to cyclically shift (rotate) the contents of register 207 to the left. So long as the least significant bit of $p'$-register 206 is a binary zero, detector 209 enables AND-gate 208. When the least significant bit of $p'$-register 206 is a binary one, detector 209 inhibits further B-pulses from being gated from AND-gate 208 and produces a signal extending to generator 205, causing generator 205 to cease generating B-pulses.

In overall function, the above activity acts to rotate the contents of register 207 to the left by the number of bit position by which the single bit contained in $p'$-register 206 is offset from the LSB position. Thus, the value of the datum address $j$ stored in register 207 is multiplied by $2^p$.

Generator 205 next emits a C-pulse which causes the value now stored in address register 207 to be incremented by the number stored in $q$-register 202. To this end, the outputs of register 207 and of $q$-register 202 extend as inputs to adder 211. The sum of the inputs is formed using one's complement arithmetic (end-around-carry) and gated by the C-pulse into register 207. This completes the address calculations $2^p j + q$ in register 207.

Access Sequence Generation — 2-Shuffle

Having calculated the current cell address ($2^p j + q$) of $datum_j$, it is now desired to generate a sequence of shift and shuffle pulses to move the datum at cell address $2^p j + q$ into $cell_0$ where the datum may be accessed. The technique used to accomplish this goal is to alter the cell address stored in address register 207 while simultaneously issuing shift and shuffle pulses which correspond in effect to the address alteration. When the contents of register 207 have been reduced to all zeros, the sought datum will have been moved into $cell_0$. The two alterations of the contents of register 207 are (1) to reset the least significant bit from one to zero; and (2) to rotate its contents one bit position to the left.

Resetting the LSB of register 207 is equivalent to decrementing the contents of q-register 202. This is apparent from the fact that the quantity $2^p j + q$ is changed to $2^p j + (q-1)$ when the LSB is reset from one to zero. The decrementation of $q$-register 202 is reflected in memory 200 by a shift rearrangement, as was discussed in the prior section on mathematical considerations.

Rotating the contents of register 207 to the left is equivalent to rotating the contents of both the $p$and $q$-registers 201 and 202 respectively to the left. This is seen from the fact that the quantity $2^p j + q$ stored in register 207 is changed to 2 [$2^p j$ + q] by this process. As discussed in the prior section on mathmetical considerations, this alteration of $p$-register 201 and $q$-register 202 is reflected by a shuffle of memory 200.

Each reset or rotation operation on register 207 is accompanied by an appropriate alteration of p-register 201 and/or $q$-register 202 and an appropriate rearrangement of memory 200. Thus register 207 always contains the correct current cell address $2^p j + q$ for $datum_j$, following each alteration.

Rotation of register 207 is used to bring successive bits to the LSB position where the bits are reset to zero in order to reduce the address contained in register 207 to all zeros. All zeros detector 212 will sense this condition and return a completion signal to clock and control signals generator 205 and to the external circuitry which requested memory access.

To cause access sequence generation, generator 205 emits a train of D-pulses. In response, LSB detector 213 senses the LSB of the contents of register 207 and gates each D-pulse onto one of two leads depending on the value of LSB being one or zero. In response to a LSB = 0, detector 213 emits a shuffle control pulse which acts to rotate to the left the contents of $p$-register 201, $q$-register 202, and address register 207. A new LSB is brought from the MSB position of register 207 to be detected.

In response to LSB = 1, a shift pulse is emitted by detector 213 which acts to reset the LSB of register 207 and which proceeds through OR-gate 204 to shift memory 200 and to decrement $q$-register 202. The next following D-pulse will find the LSB = 0 and will cause the shuffle action described in the previous paragraph. When the resetting of the LSB results in the contents of register 207 being set to all zeros, detector 212 produces an output which extends to generator 205 and halts the generation of D-pulses.

CELL ADDRESS CALCULATION FOR 2-SHUFFLE — DESCRIPTION OF PRIOR ART COMPONENTS

The P register 201 shown in FIG. 2 is implemented as a ring counter containing $p+1$ stages. Each stage contains a flip-flop for bit storage with "zero" and "one" inputs and "zero" and "one" outputs. Each stage is connected to the next (the last being connected to the first to complete the ring) by an AND gate, with inputs from the output "one" of the previous stage and a lead labeled "Rotate Left 1 Bit," shown in FIG. 2, and with an output to the "one" input of the next stage. Ring counters are well known in the art of digital circuitry design. A particular ring counter suited for this application is shown in *Computer Logic*, Flore, Ivan, Prentice-Hall, 1960, page 200, FIG. 11.9.7.

The P' register 206 is also implemented as a ring counter containing p+1 stages. Each input stage flip-flop is connected to its corresponding stage output of P register 201 through an AND gate enabled by the A pulse from generator 205. Each stage is connected to the previous one by an AND gate enabled by B pulses labeled in FIG. 2 as "Shift Right 1 Bit." The ring counter referenced above is suitable for the P' register, but here it is connected not to shift the last stage "one" around to the first stage "one," but merely resets the last stage to "zero" if a "one" has been shifted out of it.

The LSB Detector 209 is realized as an inverter connected to the "one" output of the right-most flip-flop stage of the ring counter 206. The "= 1" lead of the LSB Detector is a lead connected directly from the "one" output of the right-most flip-flop stage of the ring counter; the "=0" lead of the LSB Detector is a lead from the output of the inverter. The "=0" lead will be a positive pulse so long as the last stage of the P' register 206 is set to "0," and will enable AND gate 208 to pass B pulses to P' register 206 and Address register 207.

The Address register 207 is implemented as a shift register containing $p+1$ stages. Each stage contains a flip-flop for bit storage with "zero" and "one" inputs and "zero" and "one" outputs. Each stage output "one" or "zero" is connected to the successive stage input "zero" and "one" through individual AND gates enabled by the lead labeled "Rotate Left 1 Bit" and through individual delay elements. The left-most stage is similarly connected to the right-most stage completing the shift register configuration. Shift registers are well known in the art of digital circuitry design. A particular shift register suited for this application is shown in *Computer Logic*, Flores, Ivan, Prentice Hall, 1960, page 163, FIG. 10.5.2. Each stage is initialized by a lead contained in the plurality of leads labeled "Address Bus" in FIG. 2. Each lead, corresponding to the binary position of a binary number representing a desired address in memory, is enabled by an A pulse from generator 205 through an AND gate and is input into the corresponding "one" input stage of the shift register.

The LSB Detector 213 consists of leads from the "zero" and "one" outputs of the right-most stage of shift register 207, enabled through AND gates with D pulses from signal generator 205.

The All Zeros Detector 212 consists of a multiple input AND gate for input leads from each "zero" output of shift register 207 stages. Output of this AND gate is produced when each stage is set to "zero."

Register Q 202 is a shift register of the same construction as Address register 211. The lead "Rotate Left 1 Bit" to it serves exactly the same function in enabling the contents of a right-hand stage to be shifted to the successive left stage with the left-most stage contents being shifted to the right-most stage. The decrement lead is connected through appropriate AND gates along with inputs from the outputs of each stage of the shift register to produce input pulses at the input stages such that the binary representation of a number stored in the combined stages is reduced by one. For example, if the shift register is in a state 001, the decrement pulse enables a pulse to be sent to the "zero" input of the right-most stage resulting in a binary representation of 000.

Adder circuit 211 is a sequence of full adder stages with respective "one" outputs of stages of Q register 202 and Address register 207 connected to respective augend and addend inputs. The carry out of each full adder stage is connected to the carry in of each successive stage except the left-most stage where the carry out is connected to the carry in of the right-most stage. Each stage sum output is connected to the input of the corresponding stage of address register 207 through AND gates enabled by C pulses generated by control signals generator 205. Full adder circuits are well known in the art of digital circuitry design. A full adder is described in *Computer Logic*, Flores, Ivan, Prentice-Hall, 1960, page 153, FIG. 10.3.2.

The Clock and Control Signals Generator 205 is a sequence of pulse-train generators connected to generate A, B, C, and D pulse trains shown in FIG. 2. A begin pulse triggers the first pulse-train generator which generates pulse A. Pulse A is used to trigger another pulse-train generator which generates a sequence of B pulses. A pulse from LSB Detector 209 is used to inhibit further B pulses and to trigger another pulse-train generator to generate a C pulse. The C pulse is also used to trigger another pulse-train generator to start a sequence of D pulses. A pulse from All Zeros Detector 212 is used to inhibit further D pulses. Pulse-train generators are well known in the art of digital circuitry design. A pulse-train generator is described in *Computer Logic*, Flores, Ivan, Prentice-Hall, 1960, page 201, FIG. 11.10.2.

An exemplary 2-shuffle memory suitable for use at 200 in FIG. 2 is shown in the schematic diagram of FIG. 3. The memory of FIG. 3 inlcudes memory storage cells C0 through C6. The details of cell C3 are shown, cells C1 through C6 all being identical. Cell C0, the output cell, is also shown in detail. The memory of FIG. 3 contains $N = 7$ single bits of storage. Any number of such memories may be used in parallel for expanded storage. Common shift and shuffle control signals would extend to all such memories in the obvious fashion.

Cell C3 contains a single flip-flop 335 which is a D-type flip-flop such as the RCA CD4013A. Such a flip-flop takes on the state applied to the D or data input during the positive transition of a pulse applied to the CL or clock input. The output of previous cell C4 is applied over lead 330 to AND-gate 331. A shift control pulse is applied to AND gate 331, permitting the state of lead 330 to control the output of AND-gate 331 which extends through OR-gate 333 to the D input of flip-flop 335. Simultaneously, the shift control pulse is applied to OR-gate 334 to provide a positive transition at the CL input of flip-flop 335. Thus, the output state of cell C4 is transferred to flip-flop 335 of cell C3. The output of cell C3 is transferred on lead 336 to the input of cell C2 in the same manner. AND-gate 301 and OR-gates 303 and 304 of cell CO operate in the analogous fashion to AND-gate 331 and OR-gates 333 and 334, respectively, of cell C3 in order to transfer the contents of cell C1 to cell CO under a shift control pulse. Thus, the entire contents of the memory register are cyclically shifted under the influence of a shift control pulse.

Subcombination 300 of FIG. 3 shows the interconnection pattern which rearranges data in the 2-shuffle memory in response to a pulse on the shuffle input lead. Outputs from cells C1 through C6 are designated X1 through X6, respectively. Inputs to cells C1 through C6, respectively, are designated I1 through I6, respectively. Interconnecting links from outputs to inputs are designated L1 through L6. Input 337 of cell C3 is designated I3 and is connected to the output X5 of cell C5 by link L5. Input 337 extends to AND-gate 332 of cell C3. Under the influence of a shuffle control pulse AND-gate 332 permits the state of lead 337— corresponding to the output state of cell C5— to extend to the output of AND-gate 332 and OR-gate 333 to appear at the D input to flip-flop 335. A shuffle control pulse will proceed through OR-gate 334 to the CL clock input of flip-flop 335. The positive transition of the shuffle control pulse causes flip-flop 335 to take on the prior state of cell C5.

In a similar fashion the inputs and outputs of cells C1 through C6 are interconnected as shown in subcombination 300. Cell CO is not affected by a shuffle control pulse and flip-flop 305 retains its current state.

The contents of cell CO, the output stage of the 2-shuffle memory, may be read from the data-out lead extending from flip-flop 305. The contents of cell CO may be written to conform to the state of the data-in lead which extends to AND-gate 302. When a write control pulse is applied to AND-gate 302 and OR-gate 304, the state of the data-in lead is gated through AND-gate 302 and OR-gate 303 to the D input of flip-flop 305. The write control pulse proceeds through OR-gate 304 to the CL input of flip-flop 305. The leading edge of write control pulse causes flip-flop 305 to take on the state of the data-in lead. The data-out, write and data-in leads are part of the data bus shown in FIGS. 1 and 2.

Figure 4:
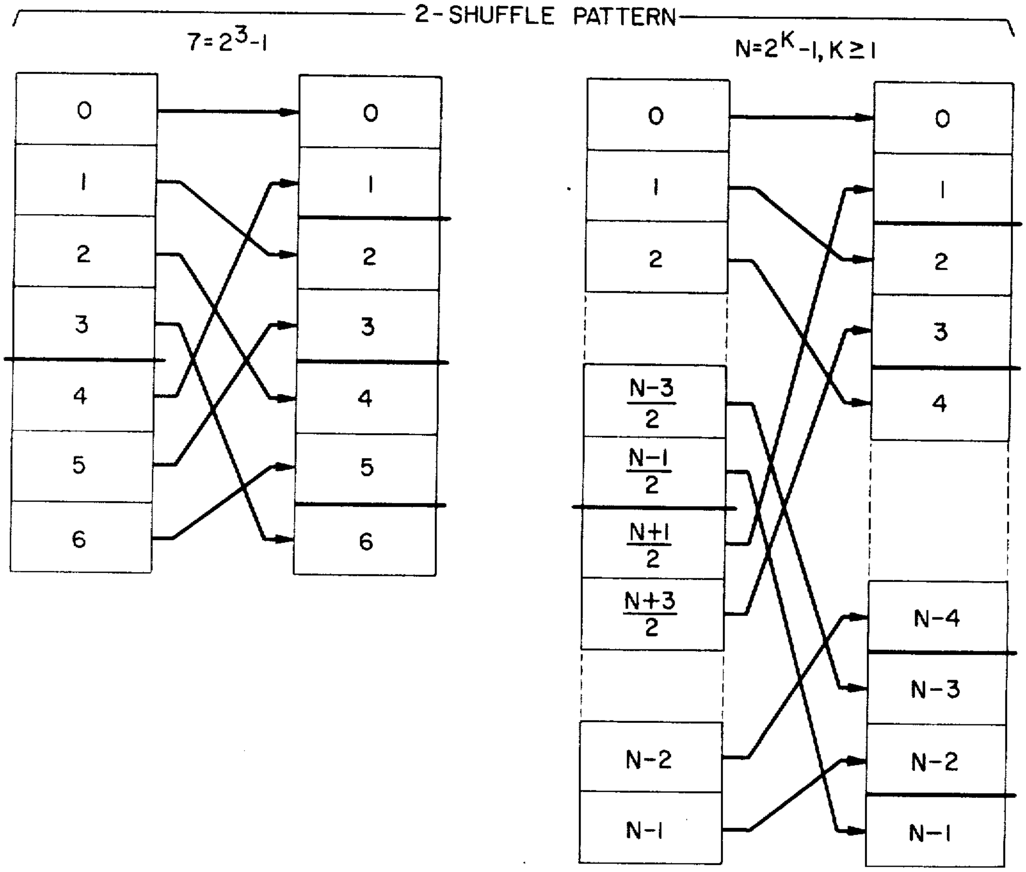
FIG. 4 is a shuffle interconnection pattern for a 2-shuffle memory.

The shuffle interconnection pattern shown at 300 in FIG. 3 is summarized in diagrammatical form at the left of FIG. 4 for the case $N=7$. The contents of $cell_0$ remains in $cell_0$, the contents of $cell_1$ moves to $cell_2$, $cell_2$ to $cell_4$, et cetera. The analogy between the 2-shuffle pattern and a shuffle of a deck of cards is well illustrated by FIG. 4. The storage locations are divided essentially into an upper and lower half, and alternate members of each half are interlaced to form a new data arrangement.

This analogy is not exact. A deck of 52 cards—an even number— divides exactly into two halves in the 2-shuffle pattern, the number of storage locations N is always one less than an internal power of two and is therefore constrained to be an odd number of locations. The upper "half" therefore contains exactly $N + 1$ locations numbered from zero to $N - 1/2$. The lower "half" contains one less storage location than the upper "half."

The general form of the 2-shuffle interconnection pattern for any value of $k$ is shown at the right of FIG. 4 and can be directly used as an interconnection pattern similar to that shown at 300 in FIG. 3.

Figure 5:
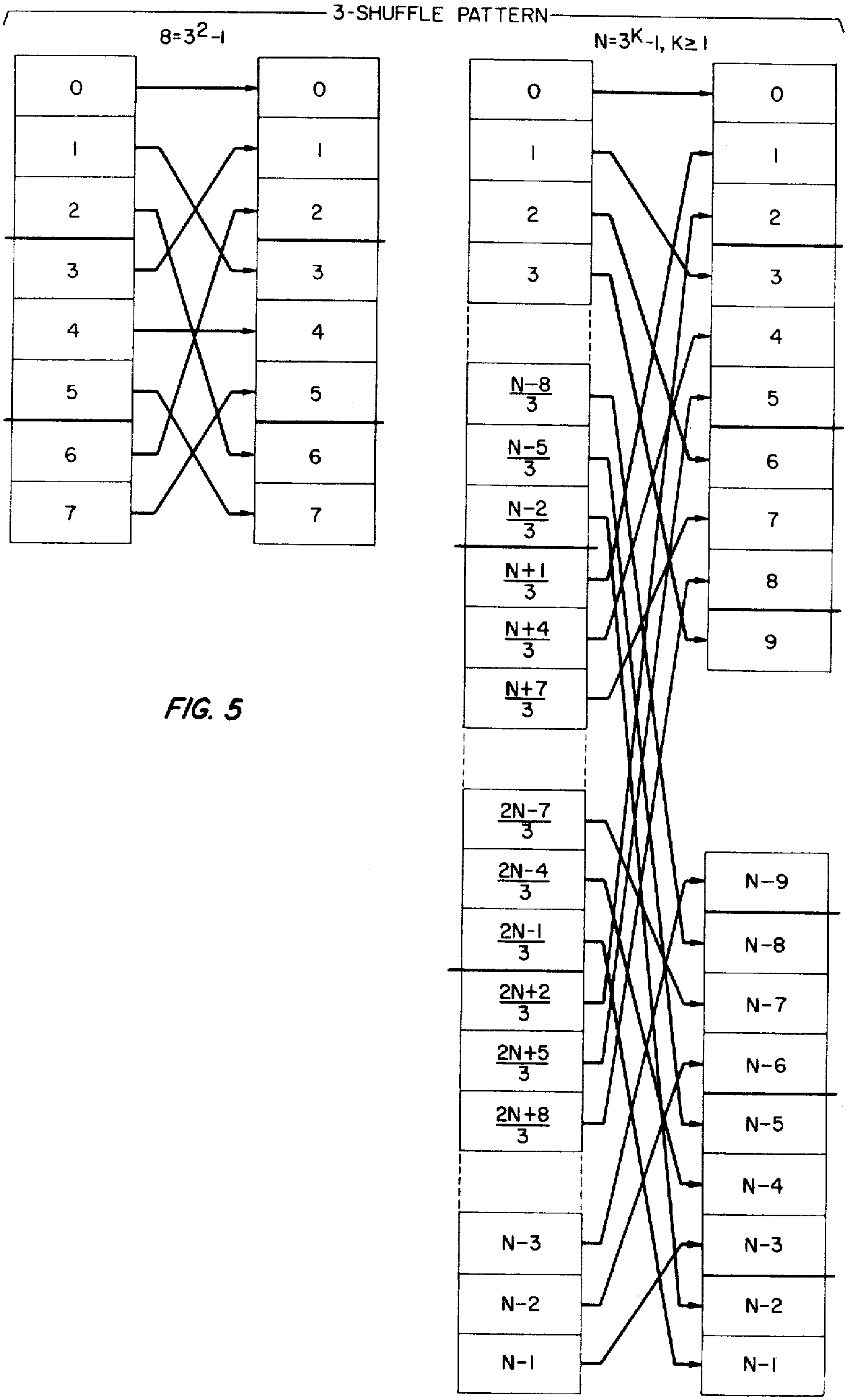
FIG. 5 is a shuffle interconnection pattern for a 3-shuffle memory.

Having described the operation of a 2-shuffle memory system in detail the results will now be generalized to memory systems for all radices, greater than or equal to two. The general expression for the number N of storage locations will be recalled as $N = r^k-1$. FIG. 5 shows in diagrammatical form the shuffle interconnection pattern for a 3-shuffle memory. At the left in FIG. 5 is the case $N = 8 = 3^2-1$. The storage locations are divided into upper, middle and lower "thirds" the lower "third" having one fewer storage locations than the other two. During the shuffle, the topmost cell, $cell_0$, retains its contents. The contents of the first cell of the middle "third" moves to the second cell. The contents of the first cell of the lower "third" moves to the third cell, et cetera. The analogy to a card shuffle breaks down, because it is not usual to divide a deck into thirds before interlacing and reuniting the deck. The general pattern of the 3 -shuffle for any value of $k$ is shown at the right of FIG. 5 and can be directly used as an interconnection pattern for a shift register memory similar to that shown in FIG. 3 but having a total of $3^k-1$ storage locations.

Figure 6:
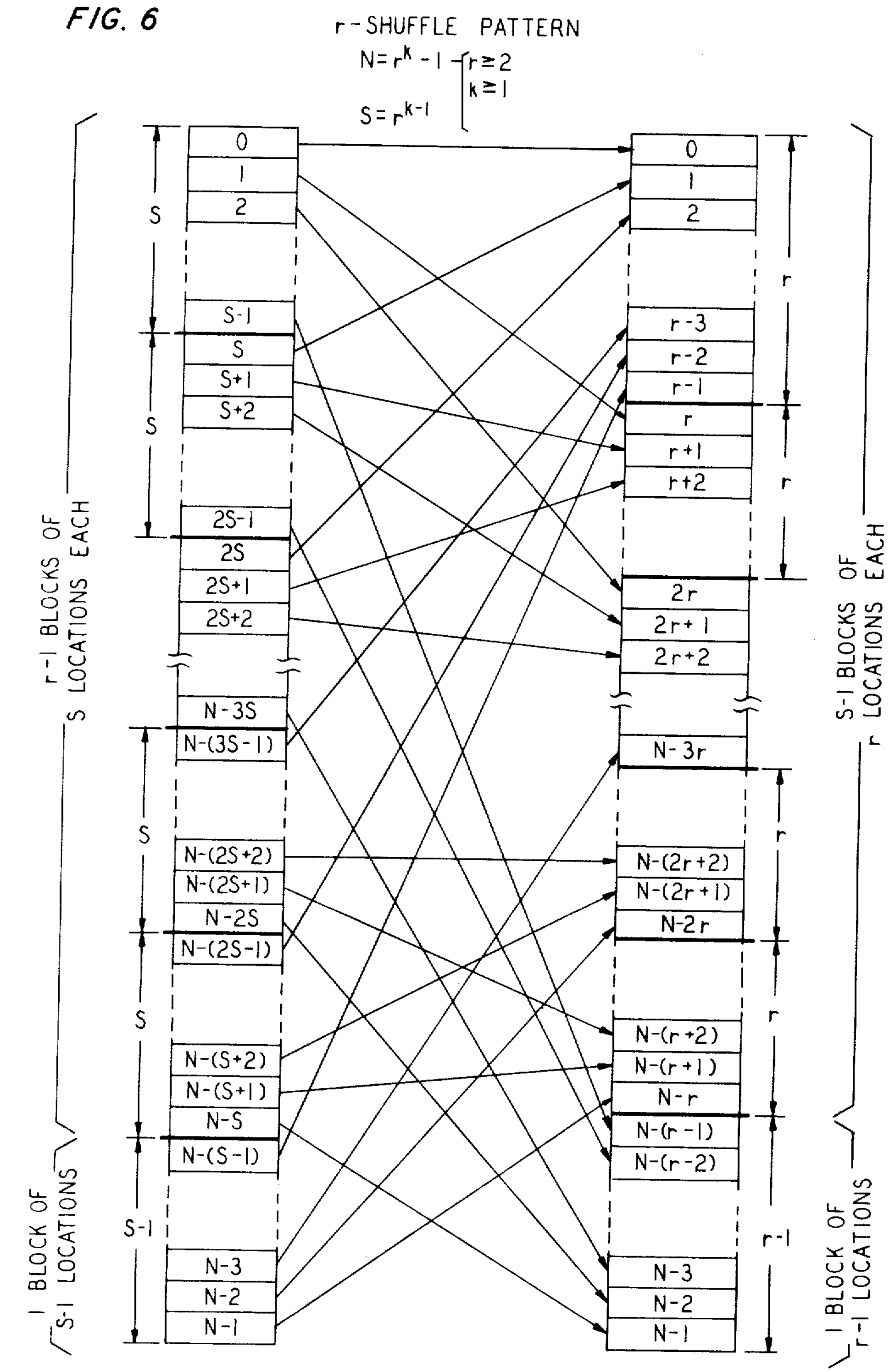
FIG. 6 is a shuffle interconnection pattern for an $r$-shuffle memory.

FIG. 6 shows in diagrammatical form the shuffle interconnection pattern with a general $r$-shuffle memory. For convenience the quantity $r^{k-1}$ is defined to be S. The N locations are initially divided into $r$ blocks each containing S memory locations with the exception of the last which contains S−1. The topmost cell retains its contents under the shuffle rearrangement. The contents of the topmost cell of the second block moves to the second location. The contents of the topmost cell of the third block moves to the third location, et cetera. For any desired value of $r$ and $k$, the pattern shown in FIG. 6 can be directly used as an interconnection pattern for use in a memory similar to that shown in FIG. 3.

The general form of control circuitry for an $r$-shuffle memory system will be described with respect to FIG. 7. The $r$-shuffle memory 700 is designed according to the above description for some specific value of radix $r$. The control circuitry of FIG. 7 varies principally from that of FIG. 2 in that $q$-register 702, adder 711 and address register 707 are arranged to manipulate digits expressed in some desired base $r$ notation rather than only binary notation. Thus, $q$-register 702 contains a series of binary coded digits each of which can take on the values zero to $r-1$.

For radix 10 for example, registers 702 and 707 contain decimal digits and adder 711 will be a nine's complement adder. Left rotation of registers 702 and 707 cyclically shifts the contents left by one decimal digit, the most significant digit (MSD) being entered into the least significant digit (LSD) position. The $q$-register 702 is decremented using $r-1$'s complement arithmetic. For example, when $q$-register 702 is in the all zero state, decrementation yields all nine's except for the LSD which is reset to eight. This can be implemented by the known technique of end-around-borrow.

Figure 7:
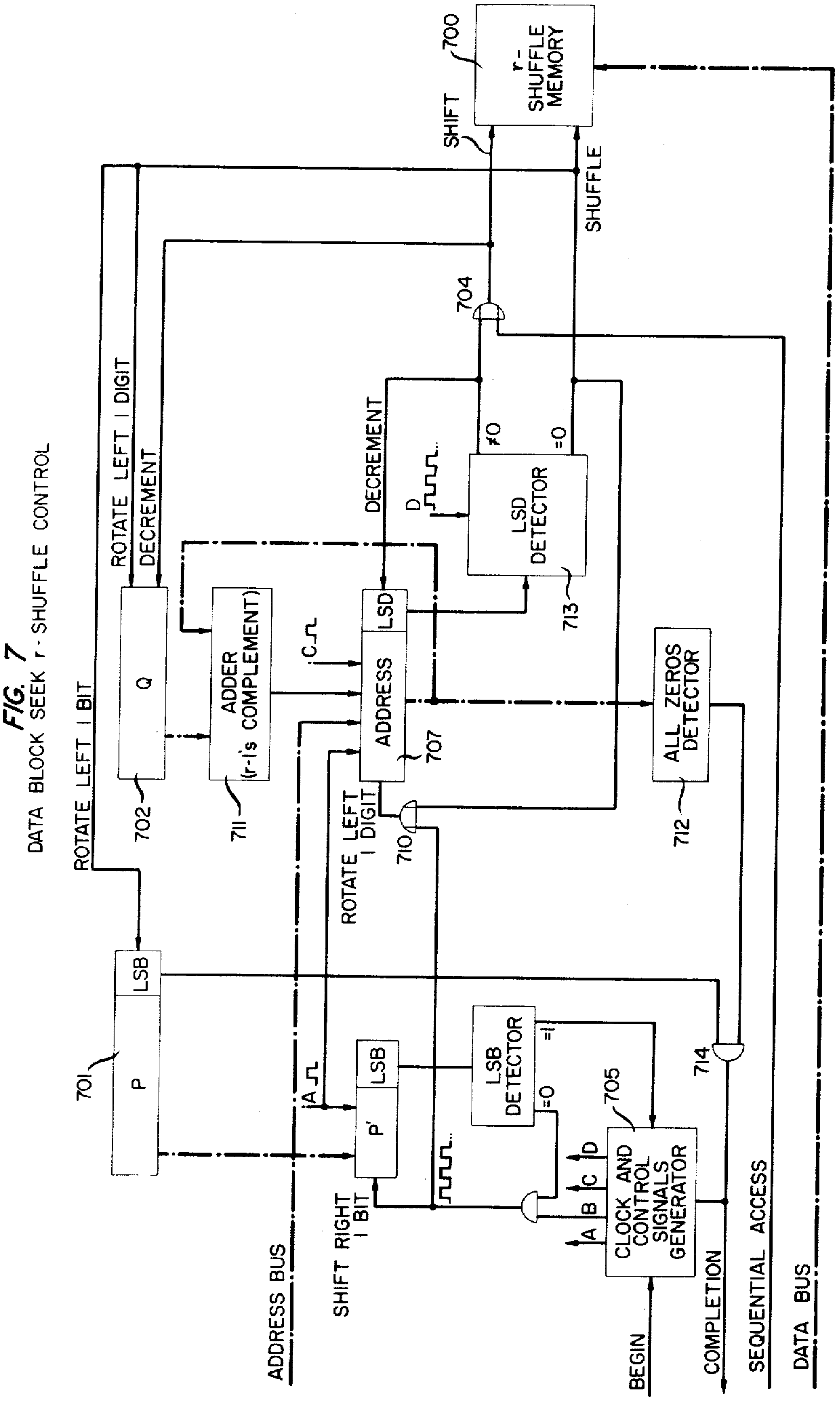
FIG. 7 is a control circuit for providing random access to a *r*-shuffle memory including circuitry for abbreviated accessing of sequential datum addresses.

The circuit of FIG. 7 differs from that of FIG. 2 in that LSB of $p$-register 701 is detected in order to derive the completion signal. Completion for FIG. 7 occurs when datum$_j$ has been moved to cell$_0$ and datum$_{j+1}$ has been moved into cell$_1$. FIG. 7 is more general than FIG. 2 in that register 707 is a cyclic shift register and down counter, pulses from LSD detector 713 acting to decrement the contents of register 707 instead of resetting the least significant bit as in FIG. 2.

MATHEMATICAL CONSIDERATIONS — $r$-SHUFFLE

The expression used for calculating the current cell address of a given datum address $j$ is the expression $$r^p j + q \text{ (modulo N)} \quad (2)$$

where $p$ and $q$ are the contents of $p$-register 701 and $q$-register 702, respectively. The contents of p-register 701 is a single one whose offset from the LSB position represents powers of $r$ when used in the circuit of FIG. 7.

The $p$-register 701 and $q$-register 702 are initialized to the values one and zero, respectively. The cell address of datum$_j$ is then equal to $r^p j + q$ (modulo N)
$= 1 \cdot j + 0$ (modulo N)
$= j$.

The effect of a cyclic shift is to reduce the value of $q$ by one (modulo N). Thus, the new cell address is $r^p j + (q-1)$ (modulo N). This expression indicates that the contents of $q$-register 702 is to be decremented by one for the cyclic shift.

The effect of an $r$-shuffle is to move each datum from its original cell into a cell with an address $r$ times the original address (modulo N). Thus, the new address is given by $$r^{p+1} j + rq \text{ (modulo N)}.$$

This expression indicates that the contents of $q$-register 702 is to be multiplied by $r$ (modulo N), that is cyclically shifted left by one base $r$ digit. In addition, the contents of $p$-register 701 is to be multiplied by $r$ (modulo N) which is accomplished by cyclically shifting its contents to the left by a single bit position.

CELL ADDRESS CALCULATION — $r$-SHUFFLE

In the control circuitry of FIG. 7 the address $j$ of any desired datum$_j$ is entered into address register 707 and rotated to the left by the number of base $r$ digits by which a single one stored in $p$-register 701 is offset from the LSB position. This is accomplished by circuitry in the same manner as that described for FIG. 2. This action multiplies the value of datum address $j$ stored in register 707 by $r^p$. The contents of $q$-register 702 is next added to the contents of register 707 by the action of adder 711. The output of adder 711 is formed using $r-1$'s complement arithmetic and is gated into register 707. This completes the address calculation $r^p j + q$ in register 707.

ACCESS SEQUENCE GENERATION — $r$-SHUFFLE

It is now desired to generate a sequence of shift and shuffle pulses to move the datum at cell address $r^p j + q$ into cell$_0$ where the datum may be accessed. The technique used is completly analogous to that used in the circuitry of FIG. 2 except that the least significant digit of the address stored in register 707 may take on any one of $r-1$ possible nonzero states, and up to $r-1$ shift pulses must be emitted in order to reduce the LSD of register 707 to zero. The two alterations of the contents of register 707 are: (1) to decrement the LSD; and (2) to rotate its contents by one base $r$ digit to the left.

Decrementing the LSB of register 707 is equivalent to decrementing the contents of $q$-register 702. This is apparent from the fact that the quantity $r^p j + q$ is changed to $r^p j + (q-m)$ when the LSD is decremented $n$ times. The decrementation of $q$-register 702 is reflected in memory 700 by $n$ shift rearrangements.

Rotating the contents of register 707 to the left by one base $r$ digit is equivalent to rotating the contents of $q$-register 702 to the left by one base $r$ digit and rotating the contents of $p$-register 701 left by one bit. This is seen from the fact that the quantity $r^p j + q$ stored in register 707 is changed to $r[r^p j + q]$ by this process. This alteration of $p$-register 701 and $q$-register 702 is reflected by a shuffle of memory 700. Register 707 hence always contains the current cell address $r^p j + q$ for datum$_j$ following each alteration.

Rotation of register 707 brings successive digits to the LSD position where they are decremented. All zero detector 712 senses this condition and returns a signal, which forms part of the completion signal.

LSD detector 713 receives a train of D-pulses from generator 705 and emits these pulses on one of two leads depending on the current value of the LSD of register 707 being either zero or nonzero. So long as the LSD is nonzero, detector 713 emits D-pulses as a number of shift pulses which act to decrement register 707 and which proceed through OR-gate 704 to shift memory 700 and to decrement $q$-register 702. When LSD of register 707 has been reduced to zero, detector 713 emits a shuffle pulse which acts through OR-gate 710 to rotate register 707 to shuffle memory 700 and to rotate $p$- and $q$-registers 701 and 702.

In the event decrementation of register 707 has resulted in an all zero condition, detector 712 detects this fact and applies a signal to AND-gate 714. $Cell_0$ contains $datum_j$ at this point of operation, and the random access seek of $datum_j$ is completed. However, the embodiment of FIG. 7 includes the additional feature, not found in FIG. 2, of providing rapid access to $datum_{j+1}$. LSD detector 713 continues to detect zero in the LSD of register 707 and continues to emit shuffle pulses until $p$-register 701 is rotated to bring its single one contents into the LSB position. When this takes place, AND-gate 714 produces a COMPLETION signal which extends to generator 705 preventing the issuance of further D pulses and which extends also to external circuitry. Following this action, $datum_{j+1}$ has been brought to $cell_1$ and the entire contents of the memory reordered. Thus each datum may be read in sequence with a single shift per datum. The reason for the success of this technique is as follows:

ADDITIONAL MATHEMATICAL CONSIDERATIONS — $r$-SHUFFLE

After the initial random accessing of $datum_j$ address register 707 of FIG. 7 contains all zeros since $datum_j$ has been brought to $cell_0$. Thus, for the current values of $p$ and $q$, $$r^p j + q = 0 \text{ (modulo } N)$$

Calculating now the current cell address of $datum_{j+1}$ $$[r^p (j+1) + q] \text{ (modulo } N)$$
$$= r^p j + q \text{ (modulo } N) + r^p \text{ (modulo } N)$$
$$= 0 \text{ (modulo } N) + r^p \text{ (modulo } N)$$
$$= r^p \text{ (modulo } N).$$

Thus after the cell addressing sequence of operations described above, address register 707 will contain a single one, offset from the LSD by $p$ digits. This is the current cell address of $datum_{j+1}$, from which the accessing sequence of shift and shuffle pulses will be generated. The accessing sequence of operations will rotate the contents of register 707 left to bring the single one into the LSD position, and then decrement the register 707 a single time in order to make its contents all zeros. Thus, it is seen that the accessing sequence will consist of $(k - p)$ shuffles, followed by one shift, to bring $datum_{j+1}$ to $cell_0$.

The circuitry of FIG. 7 produces this result without the delay of generating the current cell address for $datum_{j+1}$. A total of $(k - p)$ shuffles is accompanied by rotating the contents of $p$-register 701 to the left until the LSB = 1. By neglecting to perform the final shift to bring $datum_{j+1}$ into $cell_0$, $datum_{j+1}$ remains in $cell_1$ and may be accessed at will by a single shift pulse.

Now it will be seen that the entire contents of memory has been reordered. Since the offset of the contents of $p$-register is zero, $p = 0$, and $r^p = 1$. Now the cell address for any $datum_{j+n}$ (where $n$ is the offset from $datum_j$ of any desired datum) is given by $$r^p (j+n) + q \text{ (modulo } N)$$
$$= r^p j + q \text{ (modulo } N) + r^p n \text{ (modulo } N)$$
$$= 0 \text{ (modulo } N) + 1\, n \text{ (modulo } N)$$
$$= n \text{ (modulo } N).$$

Hence the entire memory has been reordered, the $n$th datum from $datum_j$ being in $cell_n$. This result will, of course, also be achieved by a random access of $datum_j$ followed by a random access of $datum_{j+1}$, except that $datum_{j+1}$ will then be in $cell_0$.

The abbreviated circuit action of FIG. 7 in continuing to shuffle memory 700 following the zeroing of register 707 until the LSB of $p$-register 701 is detected produces the result desired in an advantageous fashion.

It will be further understood that the circuit of FIG. 7 is a general circuit intended to operate properly for any value of the radix $r$, which includes $r = 2$, a circuit embodiment for which has also been shown at FIG. 2 without circuitry for abbreviated reordering of the contents of memory.

In an alternative embodiment, $cell_1$ may be accessed by the data bus, instead of $cell_0$ in order to save the final shift in each memory access. All zero detector 712 would simply be replaced by a binary one detector, and the circuit would operate as before for random accessing. For abbreviated sequential accessing, the original input address j would be decremented by one, and the prior datum address $(j - 1)$ would be accessed. This would be followed by a shift to place $datum_{j-1}$ in $cell_0$. The memory contents would be then reordered as above described. This would result in $datum_j$ being placed in $cell_1$ and sequential access may then be undertaken.

What is claimed is:

1. A memory system comprising:

a memory containing N storage cells, where N satisfies the relationship $N = r^k - 1$, where $r$ and $k$ are selected integers $r \geq 2$ and $k \geq 1$, the storage cells of said memory being interconnected by first and second sets of interconnections, said first set providing a cyclic shift rearrangement of the contents of said memory in response to a shift control signal, said second set providing a shuffle rearrangement of the contents of said memory in response to a shuffle control signal; and control means for generating a sequence of said shift and shuffle control signals in response to a datum address of a sought datum comprising, means responsive to said datum address for registering the current cell address of said datum, means responsive to said cell address for generating a shift control signal and for decrementing said cell address, means responsive to said cell address for generating a shuffle control signal and for cyclically shifting the digits of said cell address, means responsive to said cell address for detecting a predetermined value, and means for accessing the contents of a predetermined storage cell.

2. A memory system as set forth in claim 1 wherein:

said means responsive to said datum address for registering the current cell address of said datum comprises, means for registering the number of shuffle rearrangements which have been undertaken and means for registering the current cell address of a reference datum address, and wherein, said means for generating said sequence of shift and shuffle control signals includes means for updating said number of shuffles and said current cell address.

3. A memory system as set forth in claim 2 wherein:

said control means further comprises means for providing shift control signals and for updating said current cell address in response to input signals requesting sequential access to successive datum addresses.

4. A memory system comprising:

$r^k - 1$ storage cells each storing a single datum where $r$ and $k$ are selected integers, means for generating shift and shuffle pulses which respectively shift and shuffle the contents among the storage cells, means for storing the storage cell address of a predetermined datum, means for decrementing said storage cell address in response to a shift pulse, means for shifting said storage cell address in response to a shuffle pulse, means for counting the number of shuffle pulses, and means responsive to said means for storing and said means for counting for determining the storage cell address of a given datum.

5. A memory system comprising:

$r^k-1$ storage cells each storing a single datum, where $r$ and $k$ are selected integers, means for generating shift and shuffle pulses which respectively shift and shuffle the contents among the storage cells, $q$-register means for storing the storage cell address of a predetermined datum, means for decrementing the contents of said $q$-register means in response to a shift pulse and for shifting the contents of said $q$-register means, in response to a shuffle pulse, -register means for storing the number of shuffle pulses which have occurred, means for incrementing the contents of said $p$-register means in response to a shuffle pulse, means for shifting the digits of an input datum address by the number stored in said $p$-register means, and means for incrementing the shifted datum address by the number stored in said $q$-register means.

6. A memory system comprising $r^k - 1$ storage cells each storing a single datum, where $r$ and $k$ are selected integers, means for generating shift and shuffle pulses which respectively shift and shuffle the contents among the storage cells, a $q$-register for storing the storage cell address $q$ of a predetermined datum, means for decrementing $q$ in response to a shift pulse and for shifting $q$ in response to a shuffle pulse, a $p$-register for storing the number of shuffle pulses which have been generated, means for incrementing $p$ in response to a shuffle pulse, and means for calculating a cell address $r^p j + q$ for a given datum address $j$.

7. A memory system comprising storage cells numbering $(r^k - 1)$ where $r$ and $k$ are selected integers, register means for storing a storage cell address, means for generating shift and shuffle pulses which respectively shift and shuffle the contents among the storage cells, means for decrementing the contents of said register means using $(r-1)$'s complement arithmetic in response to a shift pulse, and means for shifting the contents of said register means by one base $r$ digit in response to a shuffle pulse.

8. A shift register memory having N storage locations, where $N = r^k - 1$, for given values of integers $r$ and $k$, said storage locations being designated $cell_0$ through $cell_{N-1}$, said storage locations being connected by a first set of interconnections wherein the contents of each $cell_i$, where $i$ is any integer within the range of 1 through $N-1$, is shifted into $cell_{i-1}$ and the contents of $cell_0$ is shifted into $cell_{N-1}$ in response to a shift control signal, said storage locations further being connected by a second set of interconnections wherein the contents of each $cell_i$ is shuffled into $cell_M$, where $M = r \times i$ (modulo $N$), in response to a shuffle control signal.

9. Control means for a shift-shuffle memory having a plurality of storage locations comprising:

means for counting the number of shuffles which have been executed, means for registering the reference address of a selected datum, means responsive to said means for counting for shifting an input datum address by said number of shuffles, means for adding said reference address to the shifted datum address, thereby producing a cell address, means for decrementing the cell address and the reference address and producing a shift pulse, means for shifting the cell address, shifting the reference address, incrementing the number of shuffles and producing a shuffle pulse, and means for respectively shifting and shuffling said shift-shuffle memory in response to said shift pulse and said shuffle pulse.

10. Control means as recited in claim 9 further comprising, means for decrementing the reference address and for producing a shift pulse, thereby permitting abbreviated sequential access to successive storage locations.

11. Control means as recited in claim 9 further comprising, means for incrementing said means for counting, and shifting said reference address and for producing a shuffle pulse, and means for detecting a predetermined count, thereby permitting abbreviated rearrangement of storage location contents.

12. Control means as recited in claim 11 comprising means for reducing said count to zero, thereby reordering the contents of said memory.

13. A cyclically accessible memory system comprising means for cyclically shifting the contents of said memory system in response to a shift control signal, means for shuffling the contents of said memory system in response to a shuffle control signal, an address register for storing the address of the currently accessible data in said memory system, means for cyclically shifting the contents of said address register in response to each said shuffle control signal, and means for decrementing said address register in response to each said shift control signal.

14. The cyclically accessible memory system in accordance with claim 13 further comprising means for generating a plurality of shuffle control signals, means responsive to said means for generating for determining that the contents of said memory system is in a predetermined order, and means responsive to said means for determining for cyclically shifting the contents of said memory system.

* * * * *